United States Patent
Dai et al.

(10) Patent No.: US 8,406,288 B2
(45) Date of Patent: Mar. 26, 2013

(54) METHODS FOR REDUCING CHANNEL CHANGE TIMES IN A DIGITAL VIDEO APPARATUS

(75) Inventors: Jiwang Dai, Princeton Junction, NJ (US); Glenn Lawrence Cash, Matawan, NJ (US); Alan Jay Stein, Princeton Junction, NJ (US)

(73) Assignee: Thomson Licensing, Boulogne Billancourt (FR)

( * ) Notice: Subject to any disclaimer, the term of this patent is extended or adjusted under 35 U.S.C. 154(b) by 821 days.

(21) Appl. No.: 12/226,299

(22) PCT Filed: Dec. 18, 2006

(86) PCT No.: PCT/US2006/048215
§ 371 (c)(1),
(2), (4) Date: Oct. 14, 2008

(87) PCT Pub. No.: WO2007/120245
PCT Pub. Date: Oct. 25, 2007

(65) Prior Publication Data
US 2009/0066852 A1    Mar. 12, 2009

Related U.S. Application Data

(60) Provisional application No. 60/792,899, filed on Apr. 18, 2006.

(51) Int. Cl.
*H04N 7/12* (2006.01)
*H04N 9/475* (2006.01)
(52) U.S. Cl. .................. 375/240.01; 348/731; 348/518
(58) Field of Classification Search ............ 375/240.01; 348/731
See application file for complete search history.

(56) References Cited

U.S. PATENT DOCUMENTS

| 5,710,798 A * | 1/1998 | Campana, Jr. ............... 375/347 |
| 6,334,217 B1 | 12/2001 | Kim |
| 7,430,222 B2 * | 9/2008 | Green et al. ................ 370/486 |
| 2002/0040481 A1 | 4/2002 | Okada et al. |

(Continued)

FOREIGN PATENT DOCUMENTS

| EP | 1 139 665 A1 | 10/2001 |
| JP | 2008-521363 | 6/2008 |

(Continued)

OTHER PUBLICATIONS

Boyce et al.:"Fast Efficient Channel Change", IEEE, Thomson Corporate Research, Princeton, NJ, USA, 2005.

(Continued)

*Primary Examiner* — Taghi Arani
*Assistant Examiner* — Mohammad Rahman
(74) *Attorney, Agent, or Firm* — Robert D. Shedd; Paul P. Kiel (57) ABSTRACT

A digital video apparatus provides reduced channel change times. According to an exemplary embodiment, the digital video apparatus includes at least one receiver for receiving first and second video streams representing the same program, wherein the first video stream has at least one characteristic different from the second video stream; a first signal processor for processing the first video stream to generate a first processed video stream; a second signal processor for processing the second video stream to generate a second processed video stream having a delay with respect to the first processed video stream; a renderer for rendering the second processed video stream responsive to a channel change command; and a switch for switching from the second processed video stream to the first processed video stream after the renderer begins rendering the second processed video stream, and thereby causing the renderer to begin rendering the first processed video stream.

13 Claims, 5 Drawing Sheets

U.S. PATENT DOCUMENTS

| | | |
|---|---|---|
| 2003/0159157 A1 | 8/2003 | Chan |
| 2003/0196211 A1 | 10/2003 | Chan |
| 2004/0001500 A1 | 1/2004 | Castillo |
| 2005/0190781 A1 | 9/2005 | Green et al. |
| 2006/0075428 A1 | 4/2006 | Farmer et al. |
| 2006/0230176 A1 | 10/2006 | Dacosta |
| 2006/0294540 A1 | 12/2006 | Perlman |
| 2009/0245393 A1 | 10/2009 | Stein et al. |

FOREIGN PATENT DOCUMENTS

| | | |
|---|---|---|
| WO | 2004/062291 A1 | 7/2004 |
| WO | WO 2004/070953 | 8/2004 |
| WO | 2005/112465 A1 | 11/2005 |
| WO | WO2006016950 | 2/2006 |
| WO | 2006/057938 A2 | 6/2006 |

OTHER PUBLICATIONS

International Search Report, dated Jun. 6, 2007.

Cho, Chunglae, et al., "Improvement of Channel Zapping Time in IPTV Services Using the Adjacent Groups Join-Leave Method", Network Technology Laboratory, ETRI, pp. 971-975.

Keutgen, T., et al., "Multi-tier Architecture for Distributed Interactive Simulation over broadcast channels", IST-1999-12100, pp. 27-39.

* cited by examiner

Solution 1

METHODS FOR REDUCING CHANNEL CHANGE TIMES IN A DIGITAL VIDEO APPARATUS

CROSS REFERENCE TO RELATED APPLICATION

This application claims the benefit, under 35 U.S.C. §365 of International Application PCT/US2006/048215 filed Dec. 18, 2006, which was published in accordance with PCT Article 21(2) on Oct. 25, 2007 in English and claims priority of U. S. Provisional patent application No. 60/792,899 filed Apr. 18, 2006.

BACKGROUND OF THE INVENTION

1. Field of the Invention

The present invention generally relates to digital video apparatuses, and more particularly, to a method for reducing channel changes times in a digital video apparatus.

2. Background Information

In a digital television broadcast system, allowing viewers to change channels rapidly is an important feature. There are at least two major sources that contribute to channel change delay. The first source is from the group of picture (GOP) structure used by many video compression standards, such as MPEG-2 and H.264. In a GOP, pictures are encoded using either intra or inter coding. An intra coded (I) picture (a.k.a., frame) uses information within itself for compression, and therefore can be decoded alone. Inter-coded pictures (i.e., B or P pictures), however, must be decoded after the related intra coded pictures (I picture) are decoded. Since I pictures typically require 3 to 10 times more bits than a B or P picture, they are encoded much less frequently in the bit stream in order to reduce the overall bit rate. In a digital television broadcast system, I frames may only appear once every 1 to 2 seconds. When a digital video apparatus tunes to a program, it must wait until the first I frame is received before any picture can be decoded or displayed. This can cause a significant delay.

The second source for channel change delay is from processing components, such as buffering, forward error correction (FEC) and error concealment in the digital video apparatus (e.g., set-top box (STB)). These components require significant buffering and processing, and therefore cause delay in channel change. For an example, traffic shaping is desirable for transporting variable bit rate (VBR) streams, but it would require buffering at the digital video apparatus, which causes delay. FEC requires buffering of video packets for packet loss recovery. The digital video apparatus needs to provide buffering to hold at least one block of video packets and their associated FEC packets before decoding. 20-column and 5-row FEC protection for a 3 Mbps constant bit rate (CBR) stream may, for example, introduce a delay as high as 350 milliseconds. Error concealment, as another example, requires the detection of loss of frames, which is a delayed event. Moreover, advanced error concealment algorithms, such as optical flow based processes, offer better concealment results, but are much more computationally intensive than the traditional frame repeat method. In a modern digital video apparatus, concealing 4 consecutive frames could create a delay as long as 200 milliseconds. In order to display video without significant jitter, all these delays have to be budgeted into the digital video apparatus even though they may not always be required.

Accordingly, in view of the potentially lengthy delays associated with channel changes, there is a need for a method for reducing channel changes times in a digital video apparatus. The present invention described herein addresses this problem, and is particularly useful for dealing with channel change delays associated with signal processing within a digital video apparatus.

SUMMARY OF THE INVENTION

In accordance with an aspect of the present invention, a method for changing channels in a digital video apparatus is disclosed. According to an exemplary embodiment, the method comprises steps of receiving first and second video streams representing the same program, wherein the first video stream has at least. one characteristic different from the second video stream; processing the first video stream to generate a first processed video stream; processing the second video stream to generate a second processed video stream having a delay with respect to the first processed video stream; rendering the second processed video stream responsive to a channel change command; and subsequently switching from the second processed video stream to the first processed video stream and rendering the first processed video stream. The characteristic may be, for example, shorter GOP size, lower resolution, and/or lower bit rate.

In accordance with another aspect of the present invention, a digital video apparatus is disclosed. According to an exemplary embodiment, the digital video apparatus comprises receiving means such as at least one signal receiver for receiving first and second video streams representing the same program, wherein the first video stream has at least one characteristic different from the second video stream; first processing means such as a first signal processor for processing the first video stream to generate a first processed video stream; second processing means such as a second signal processor for processing the second video stream to generate a second processed video stream having a delay with respect to the first processed video stream; rendering means such as a renderer for rendering the second processed video stream responsive to a channel change command; and switching means such as a switch for switching from the second processed video stream to the first processed video stream after the rendering means begins rendering the second processed video stream, and thereby causing the rendering means to begin rendering the first processed video stream. The characteristic may be, for example, shorter GOP size, lower resolution, and/or lower bit rate.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein merely illustrate preferred embodiments of the invention, and such exemplifications are not to be construed as limiting the scope of the invention in any manner.

DESCRIPTION OF THE PREFERRED EMBODIMENTS

Figure 1:
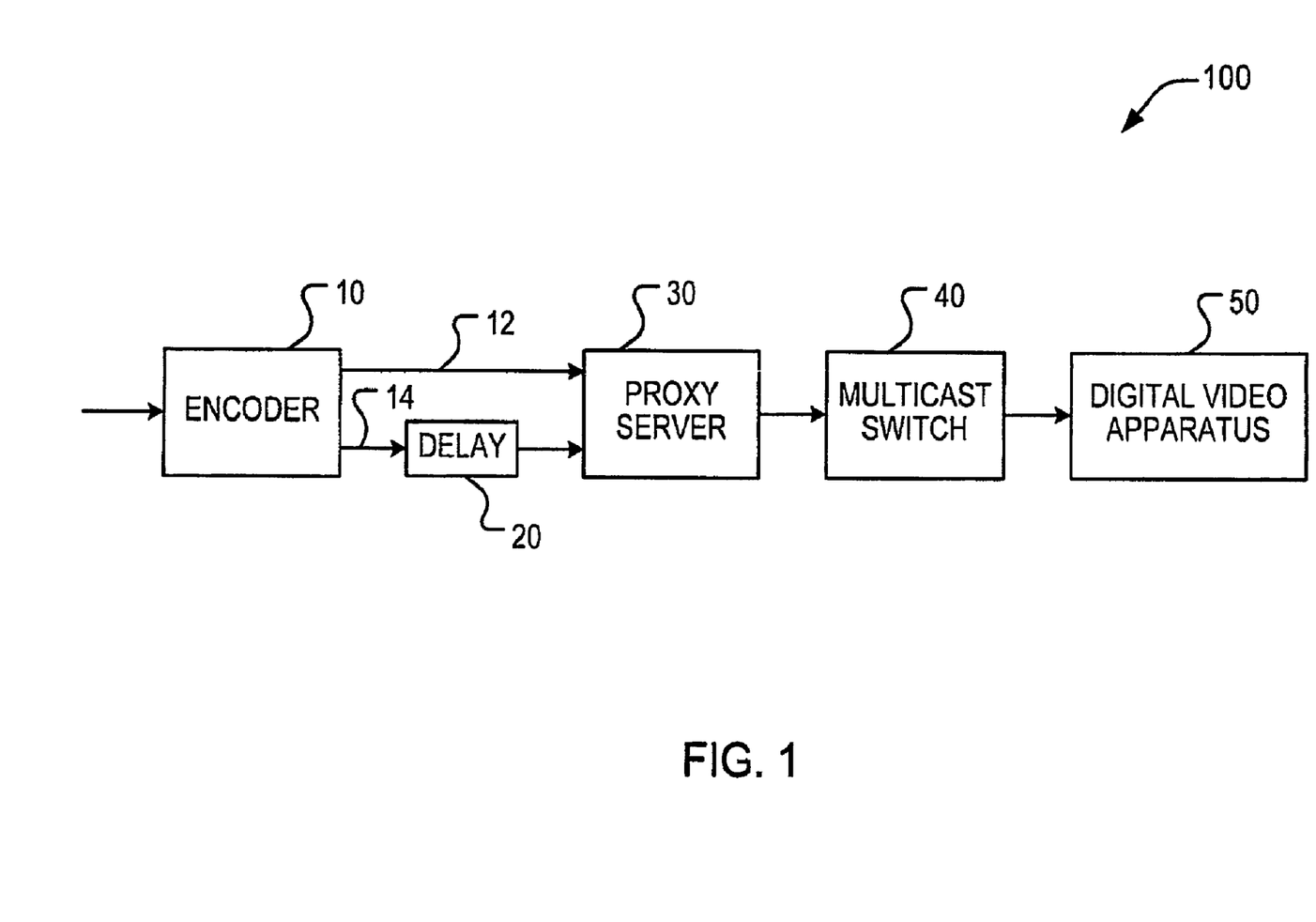
FIG. 1 is a block diagram of a system suitable for implementing the present invention.

Referring now to the drawings, and more particularly to FIG. 1, a block diagram of a system 100 suitable for implementing the present invention is shown. As indicated in FIG. 1, system 100 comprises an encoder 10, a delay unit 20, a proxy server 30, a multicast switch 40 and a digital video apparatus 50. According to an exemplary embodiment, system 100 represents an internet protocol television (IPTV) broadcast system.

In system 100, encoder 10 simultaneously encodes a broadcast program to a first stream 12 which may be referred to herein as a "regular stream" and a second stream 14 which may be referred to herein as a "channel change stream." Both streams 12 and 14 represent video content from the same program, although regular stream 12 has at least one characteristic different from channel change stream 14. According to an exemplary embodiment, channel change stream 14 has a shorter GOP size (e.g. 0.5 second shorter, etc.), lower resolution (e.g., common intermediate format (CIF), etc.) and/or lower bit-rate (e.g., less than 200 kbps, etc.) than regular stream 12.

Delay unit 20 is operative to delay channel change stream 14 for a predetermined, configurable time period (e.g., 900 milliseconds, etc.). This delay may be adaptively controlled (e.g., adjusted), for example, by a service provider for system 100. Proxy server 30 receives regular stream 12 from encoder 10 and the delayed channel change stream 14 from delay unit 20, and transmits these streams 12 and 14 to multicast switch 40. According to an exemplary embodiment, multicast switch 40 may be embodied as a Digital Subscriber Line Access Multiplexer (DSLAM).

In system 100, Internet Protocol (IP) multicast may be used to transmit compressed streams 12 and 14 through an IP backbone network to multicast switches, such as multicast switch 40, which selectively forward streams 12 and 14 to terminal devices, such as digital video apparatus 50. According to an exemplary embodiment, the Internet Group Management Protocol (IGMP) may be used in system 100 for channel selection. For example, a terminal device such as digital video apparatus 50 may send a join request for a desired channel to multicast switch 40 (e.g., DSLAM). When that channel is no longer desired, a leave request may be sent to multicast switch 40.

According to principles of the present invention, the configurable delay introduced to channel change stream 14 by delay unit 20 offsets a processing delay for regular stream 12 within digital video apparatus 50 caused by loss recovery components such as FEC and error concealment. This delay allows digital video apparatus 50 to perform necessary quality enhancements for regular stream 12 without causing significant delay (luring a channel change event. According to an exemplary embodiment, the delay can be introduced anywhere before multicast switch 40 in system 100, as shown in FIG. 1.

Figure 2:
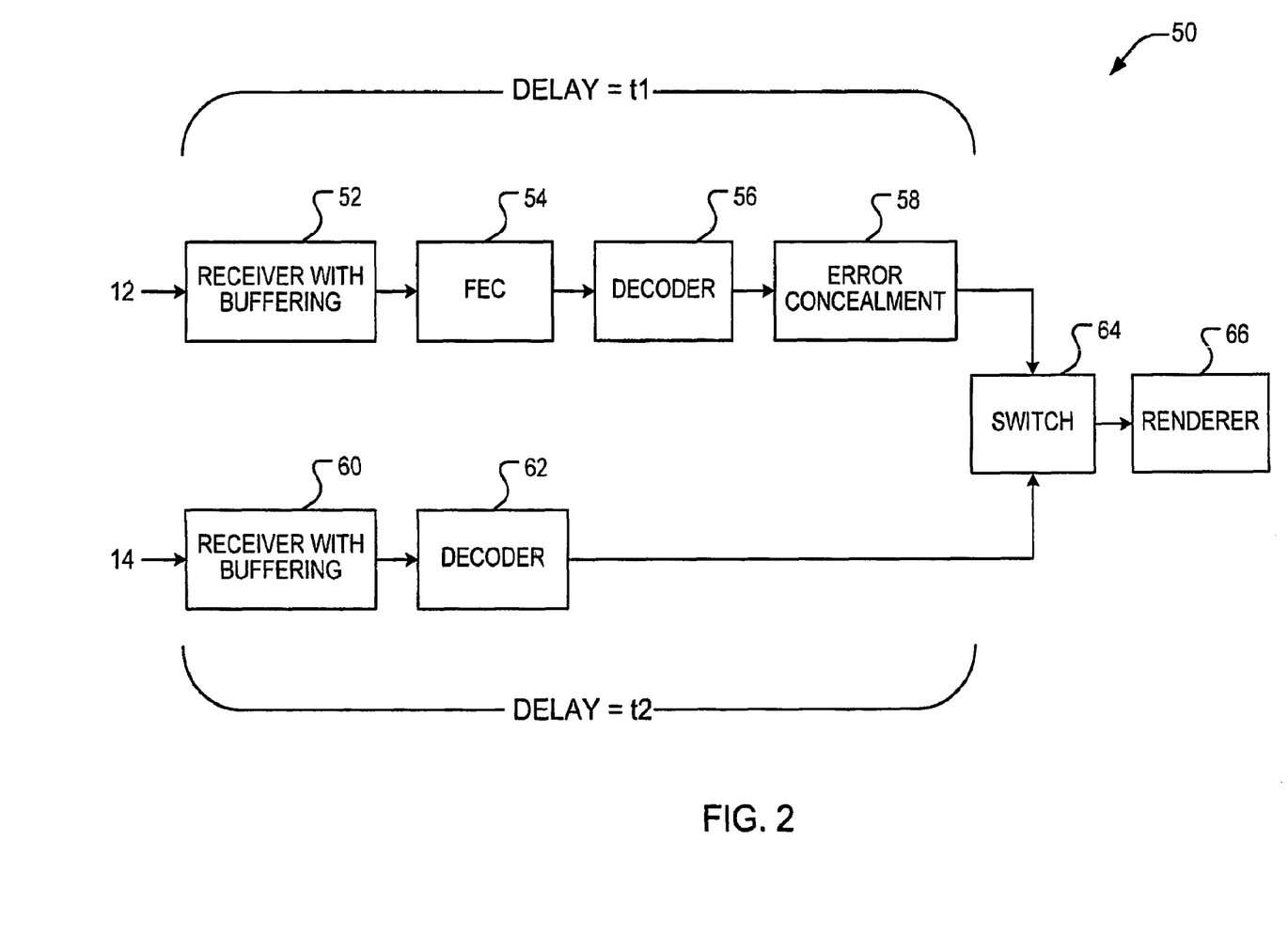
FIG. 2 is a block diagram providing further details of the digital video apparatus of FIG. 1 according to an exemplary embodiment of the present invention.

Referring to FIG. 2, a block diagram providing further details of digital video apparatus 50 of FIG. 1 according to an exemplary embodiment of the present invention is shown. As indicated in FIG. 2, digital video apparatus 50 provides separate processing paths for regular stream 12 and channel change stream 14. The processing path for regular stream 12 comprises a receiver with buffering 52, an FEC block 54, a decoder 56 and an error concealment block 58. The processing path for channel change stream 14 comprises a receiver with buffering 60 and a decoder 62. Digital video apparatus 50 further comprises a switch 64 and a renderer 66 that provides the output signal for displaying in response to the selected data stream. According to an exemplary embodiment, digital video apparatus 50 may be embodied as a set top box or any other type of digital video apparatus capable of processing digital video signals.

In FIG. 2, receiver 50 with buffering 52 receives and buffers regular stream 12 to generate a first buffered video stream. FEC block 54 operates as an error corrector and performs error correction on the first buffered video stream to generate a first error corrected video stream. Decoder 56 decodes the first error corrected video stream to generate a first decoded video stream. Error concealment block 58 operates as an error concealer and performs error concealment on first decoded video stream to generate a first, processed video stream corresponding to regular stream 12. As indicated in FIG. 2, the foregoing processing functions on regular stream 12 create a first processing delay t1.

Also in FIG. 2, receiver with buffering 60 receives and buffers channel change stream 14 to generate a second buffered video stream. Decoder 62 decodes the second buffered video stream to generate a second processed video stream corresponding to channel change stream 14. As indicated in FIG. 2, the foregoing processing functions on channel change stream 14 create a second processing delay t2, which is shorter than first processing delay t1 associated with regular stream 12 (drawings of delays with respect to each other may not necessarily be to scale).

In FIG. 2, the importance of loss recovery or error concealment to channel change stream 14 is far less than to regular stream 12. This is because channel change stream 14 is only used for a relatively short time period (e.g., less than 1 second, etc.), and in particular, for channel changes, as will be described later herein. Accordingly, the occurrence of packet loss over the local loop (i.e., not the backbone transport) during that relatively short time period is much less than with regular stream 12. Moreover, the loss of packets in channel change stream 14 has much less impact to end-users. The worst case is to lose the reduction in channel change time provided by channel change stream 14. Therefore, digital video apparatus 50 employs different levels of packet loss protection for channel change stream 14 and regular stream 12, namely weak or no FEC protection for channel change stream 14 for low latency, and strong FEC protection for regular stream 12 for better video quality, as reflected in FIG. 2.

Also in FIG. 2, traffic shaping may be used to smooth transmission rates and is often desirable for transporting VBR streams. According to an exemplary embodiment, the importance of employing traffic shaping to regular stream 12 is higher than to channel change stream 14 since regular stream 12 has a much higher bit rate. The application of traffic shaping to regular stream 12 requires extra buffering and associated delay in receiver with buffering 52. Since channel change stream 14 has a much lower bit rate, it does not necessarily require traffic shaping. Therefore, receiver 50 with buffering 60 may provide less buffering and associated delay than receiver with buffering 52.

As will hereinafter be described, switch 64 initially selects the second processed video stream output from decoder 62 (which corresponds to channel change stream 14) for rendering by renderer 66 in response to a user's channel change command before the first I frame of regular stream 12 is received. Thereafter, when an I frame has been received in regular stream 12, switch 64 switches to the first processed video stream output from error concealment block 58 (which corresponds to regular stream 12), and thereby causes renderer 66 to begin rendering the content of regular stream 12. This switching operation can reduce channel change times because the receiver need not wait for the first I frame of the regular stream 12.

Figure 3:
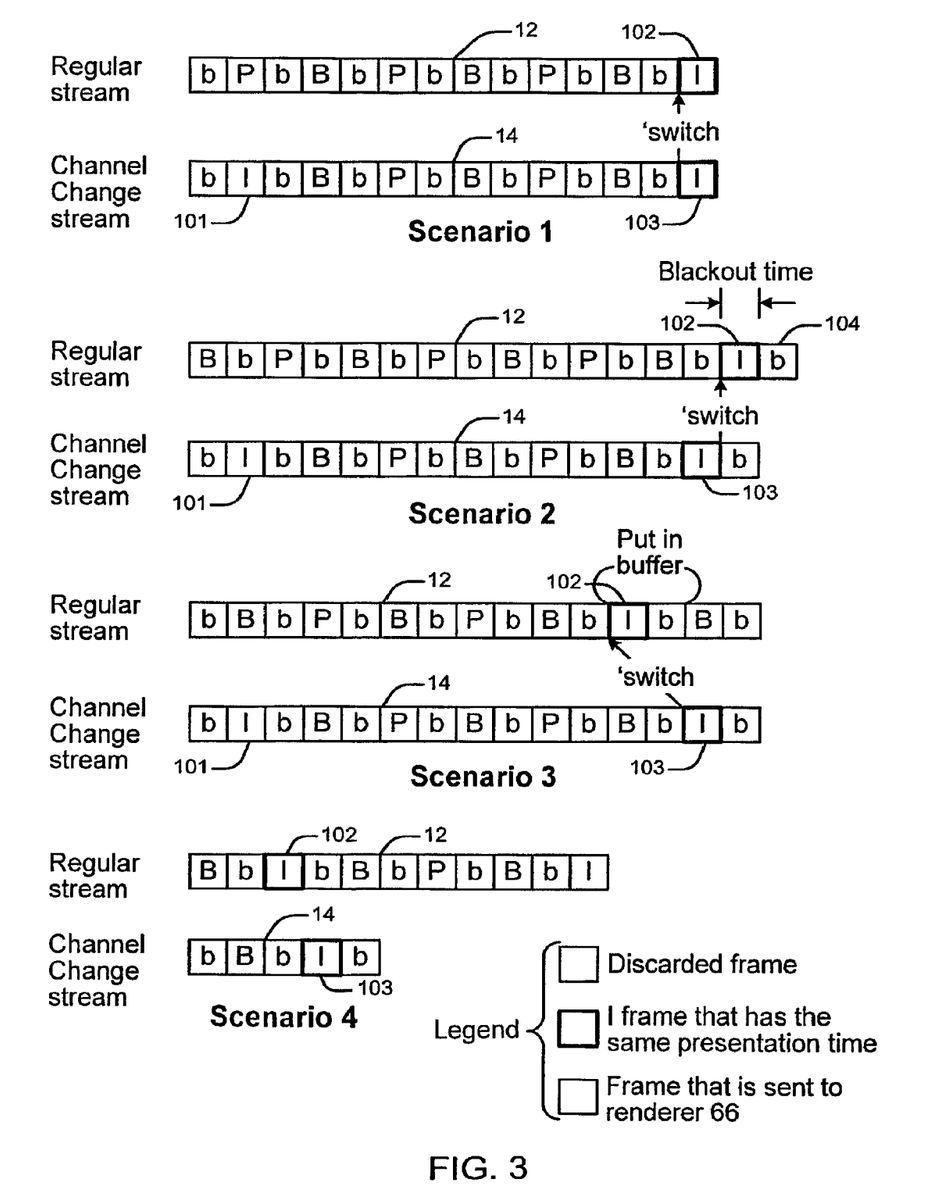
FIG. 3 is a timing diagram according to an exemplary embodiment of the present invention.

Referring to FIG. 3, a timing diagram according to an exemplary embodiment of the present invention is shown. In particular, FIG. 3 shows the timing of the streams 12 and 14 with regard to switch 64 of digital video apparatus 50 in FIG. 2 as it switches from the second processed video stream output from decoder 62 (which corresponds to channel change stream 14) to the first processed video stream output from error concealment block 58 (which corresponds to regular stream 12) in different scenarios. FIG. 3 also illustrates that it is important to not let the content of regular stream 12 lag channel change stream 14 during switching. Otherwise, a time window during which no frames are available for output may result (see Scenario 2 below). In FIG. 3, both "B" and "b" frames refer to bi-directionally predicted frames. However, "B" frames represent bi-directionally predicted frames that may be used as a reference for predicting other frames (and therefore are temporarily stored in the decoding process), while "b" frames represent bi-directionally predicted frames that are not used as a reference for predicting other frames (and therefore are discarded after being displayed).

Scenario 1 shows the timing sequence when the content of channel change stream 14 and regular stream 12 are perfectly synchronized at switch 64. In this scenario, an I frame 101 of channel change stream 14 arrives first at switch 64 before any I frame of stream 12 is received. Switch 64 delivers the content of channel change stream 14 to renderer 66 first, and thereafter switches smoothly to regular stream 12 at its first I frame 102, and then subsequently processes regular stream 12. This requires perfect synchronization and switch over timing.

Scenario 2 shows the timing, sequence when the content of channel change stream 14 is ahead of regular stream 12 by one frame. In this scenario, switch 64 delivers the content of channel change stream 14 to renderer 66 first. Again the receiver begins processing I frame 101 of stream 14 since it is the first I frame received. When the first I frame 12 of regular stream 12 is received, since it lags channel change stream 14, the corresponding I frame 103 in channel change stream 14 has already been displayed. Therefore, the I frame 102 of regular stream 12 has to be discarded. In particular, switch 64 needs to wait until the next frame (i.e., the b frame 104 after the I frame) is received. This causes a one frame time window during which no picture is sent to renderer 66.

Scenario 3 shows the sequence when the content of channel change stream 14 is behind regular stream 12. In this scenario, switch 64 can perform a smooth transition from the content of channel change stream 14 to regular stream 12. To accomplish this result, switch 64 buffers frames of regular stream 12 from its first I frame 102 until the corresponding I frame 103 of channel change stream 14 is received. Again switch 64 receives I frame 101 of stream 14 and sends the stream until I frame 102 of stream 12 is received. During the transition at I frames 102 and 103, switch 64 first sends the buffered frames and the subsequent frames to renderer 66.

Scenario 4 shows the sequence when the first I frame 102 of regular stream 12 is received before the first I frame 103 of channel change stream 14. In this scenario, switch 64 selects the content of regular stream 12 first and no transition from channel change stream 14 is necessary.

During the switch in FIG. 3, it is noted that the I frame 1-3 in channel change stream 14 is generally not rendered, and that the corresponding I frame 102 in regular stream 12 is sent to renderer 66. As described above in FIG. 3, glitches may occur during switching if regular stream 12 lags channel change stream 14 at switch 64 (see Scenario 2). As represented in FIG. 2, regular stream 12 has a longer processing delay than channel change stream 14, which may cause it to lag the channel change stream 14 when it reaches switch 64. The present invention addresses this problem by delaying channel change stream 14 before multicast switch 40 (see FIG. 1). This approach does not increase channel change times since the delay occurs before an end-user sends a channel change request, and therefore is not observed by the end-user. Another approach to this problem would be to delay channel change stream 14 in its processing path within digital video apparatus 50. However, this approach is generally undesirable since it will definitely increase channel change time, as will hereinafter be described.

Figure 4A:
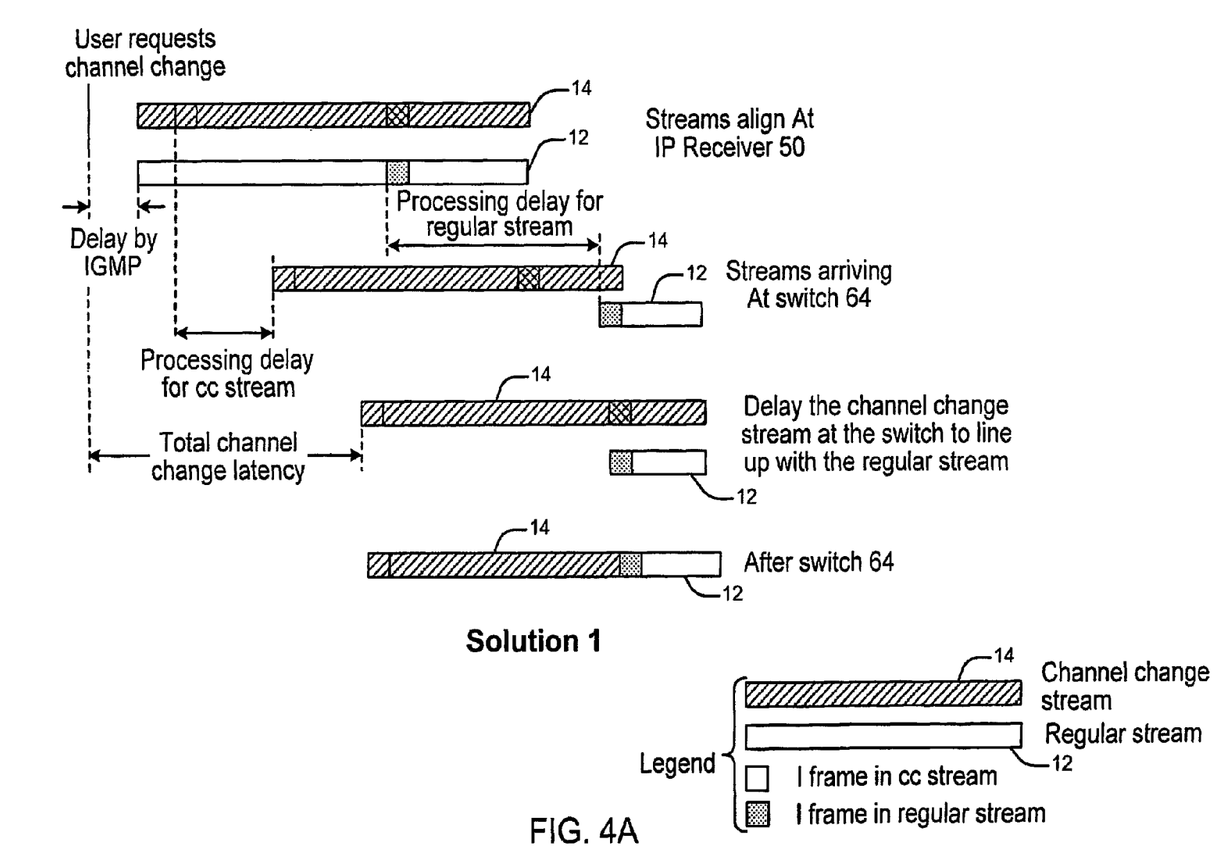
FIG. 4 is another timing diagram according to an exemplary embodiment of the present invention.
Figure 4B:
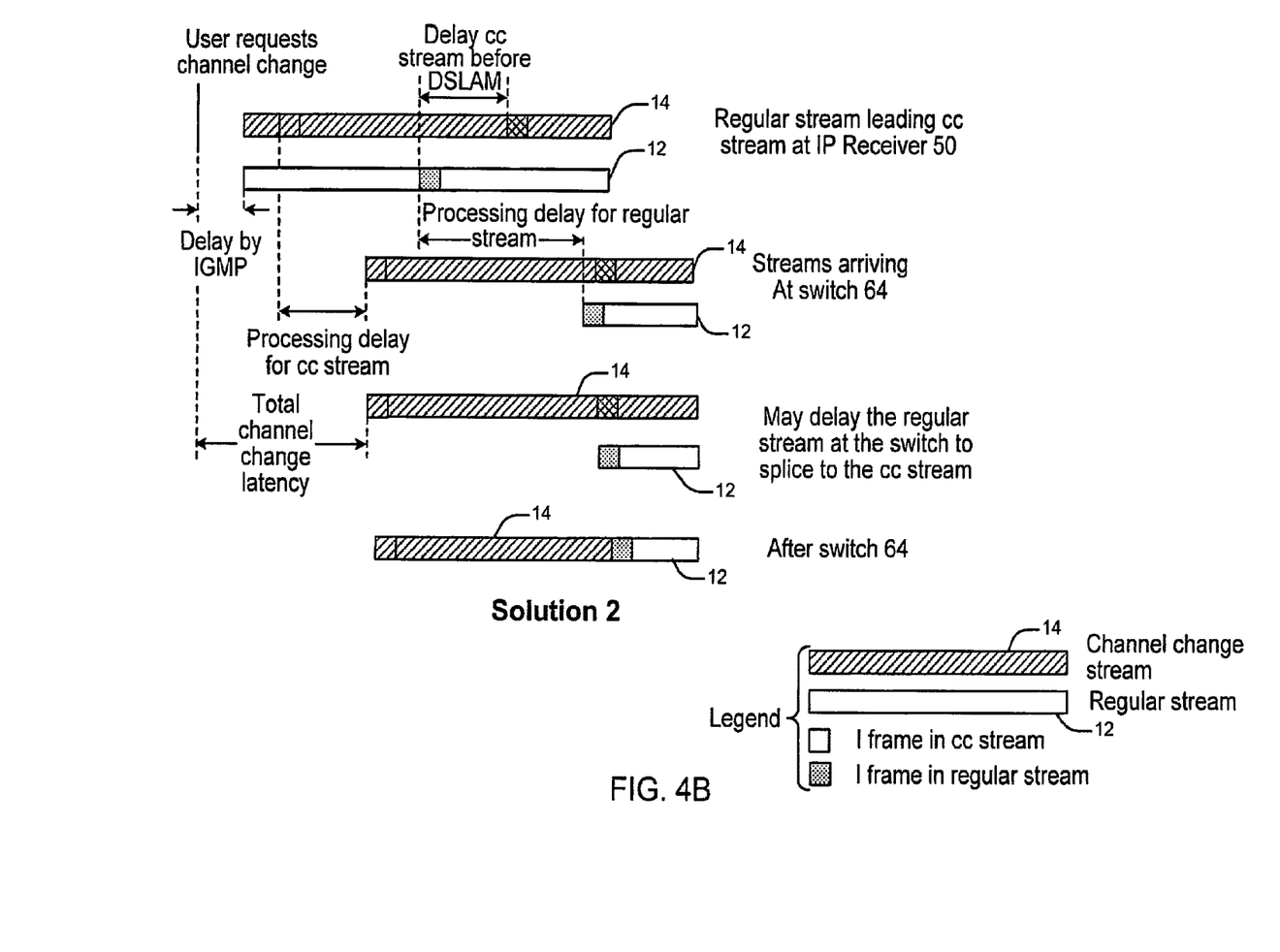

Referring to FIG. 4, another timing diagram according to an exemplary embodiment of the present invention is shown. In particular, FIG. 4 compares the delay of two solutions, namely a first solution (i.e., Solution 1 in FIG. 4) in which channel change stream 14 is delayed in its processing path within digital video apparatus 50, and a second solution (i.e., Solution 2 in FIG. 4) in which channel change stream 14 is delayed before multicast switch 40 (e.g., DSLAM) in accordance with principles of the present invention (see FIG. 1).

As represented in Solution 2 of FIG. 4, the present invention reduces channel change times by delaying channel change stream 14 before it arrives at multicast switch 40 (e.g., DSLAM), as shown in FIG. 1. Assuming that the IGMP delay is Di, the processing delay of regular stream 12 is Dr (i.e., delay t1 in FIG. 2), the processing delay of channel change stream 14 is Dc (i.e., delay t2 in FIG. 2) and the delay caused by the GOP structure is Dg, the total delay for performing a channel change without applying the principles of the present invention is:

$$D\text{total}=Dg+Di+Dr \quad (1)$$

Conversely, the total delay for performing a channel change with applying the principles of the present invention is:

$$D\text{total}=Dg+Di+Dc \quad (2)$$

if the delay applied to channel change stream 14 is equal to or greater than Dr−Dc. Since Dc (i.e., delay t2 in FIG. 2) is less than Dr (i.e., delay t1 in FIG. 2), the present invention represented by Solution, 2 of FIG. 4 reduces the delay caused by the processing time. It is noted that the applied delay to channel change stream 14 in FIG. 1 can be greater than Dr−Dc. This is because switch 64 of FIG. 2 can buffer regular stream 12 (see Scenario 3 of FIG. 3). Accordingly, a longer delay does not affect the channel change times. It only increases the delay in switching from channel change stream 14 to regular stream 12.

As described herein, the present invention provides a method for reducing is channel changes times in a digital video apparatus. Notably, the present invention provides at least: (i) Channel change stream 14 and regular stream 12 may use different levels of packet loss protection and different levels of traffic shaping. Channel change stream 14 may be applied with a low level of protection and low or no traffic shaping to obtain short latency, whereas regular stream 12 may be applied with a high level of protection and a high level of traffic shaping to obtain high video quality; (ii) Digital video apparatus 50 includes two decoders paths to select a regular stream or a channel change stream to perform a channel change. Switch 64 preferably includes a buffer management feature such that if regular stream 12 is aligned with or ahead of channel change stream 14, it can perform a smooth transition; and (iii) A delay is applied to channel change stream 14 before multicast switch 40 (e.g., DSLAM in an IPTV over DSL system) to reduce channel change times caused by the longer processing time of regular stream 12. If the delay is equal to or greater than the difference in processing time of regular stream 12 (i.e., t1 in FIG. 2) and the processing time of channel change stream 14 (i.e., t2 in FIG. 2), the total latency caused by processing delay is bound by the shorter channel change processing time.

The present invention may be applicable to various digital video apparatuses, either with or without an integrated display device. Accordingly, the phrase "digital video apparatus" as used herein may refer to systems or apparatuses including, but not limited to, television sets, computers or monitors that include an integrated display device, and systems or apparatuses such as set-top boxes, video cassette recorders (VCRs), digital versatile disk (DVD) players, video game boxes, personal video recorders (PVRs), computers or other apparatuses that may not include an integrated display device.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method for switching reception channels in a digital television broadcast system comprising:
    transmitting first and second video streams representing the same program, wherein said first video stream has at least one encoding characteristic different from said second video stream;
    receiving in a digital video apparatus said first and second video streams;
    processing said first video stream to generate a first processed video stream, said processing having a first associated processing delay, wherein said processing said first video stream comprises:
        buffering said first video stream to generate a first buffered video stream; performing error correction on said first buffered video stream to generate a first error corrected video stream; decoding said first error corrected video stream to generate a first decoded video stream; and performing error concealment on said first decoded video stream to generate said first processed video stream;
    processing said second video stream to generate a second processed video stream having a second processing delay, the second processing delay corresponding to the first associated processing delay and being shorter than the first associated processing delay with respect to said first processed video stream;
    rendering said second processed video stream responsive to a channel change command; and
    subsequently switching from said second processed video stream to said first processed video stream and rendering said first processed video stream by:
        delaying the transmission of said second video stream so that the time difference between said first and second processing delays is compensated and respective reference frames in the processed first video stream and the processed second video stream are time aligned; and
    performing the switching from said second processed video stream to said first processed video stream upon occurrence of the respective reference frames.

2. The method of claim 1, wherein said at least one encoding characteristic includes at least one of bit rate, resolution and group of picture (GOP) size.

3. The method of claim 1, wherein said first and second video streams are received via a multicast system.

4. The method of claim 1, wherein said processing said second video stream comprises:
    buffering said second video stream to generate a second buffered video stream; and
    decoding said second buffered video stream to generate said second processed video stream.

5. The method of claim 1, wherein the switching is performed in response to a predetermined portion of the first video stream being received.

6. A digital television broadcast system, comprising:
    a transmitter for transmitting first and second video streams representing the same program, wherein said first video stream has at least one encoding characteristic different from said second video stream;
    a digital video apparatus comprising:
    a receiver for receiving said first and second video streams, wherein said receiver comprises a buffering unit for receiving and buffering said first video stream to generate a first buffered video stream;
    a first processor for processing said first video stream to generate a first processed video stream with a first associated processing delay, wherein said first processor comprises:
        an error corrector for performing error correction on said first buffered video stream to generate a first error corrected video stream; a decoder for decoding said first error corrected video stream to generate a first decoded video stream; and an error concealer for performing error concealment on said first decoded video stream to generate said first processed video stream;
    a second processor for processing said second video stream to generate a second processed video stream having a second processing delay corresponding to the first associated processing delay and being shorter than the first processing delay;
    a renderer for rendering said second processed video stream responsive to a channel change command; and
    a switch for switching from said second processed video stream to said first processed video stream after said renderer begins rendering said second processed video stream, and thereby causing said renderer to begin rendering said first processed video stream by further including a delay unit for delaying the transmission of said second video stream so that the time difference between said first and second processing delays is compensated and respective reference frames in the processed first video stream and the processed second video stream are time aligned; and by
    switching from said second processed video stream to said first processed video stream upon occurrence of the respective reference frames.

7. The digital television broadcast system of claim 6, wherein said at least one encoding characteristic includes at least one of bit rate, resolution and group of picture (GOP) size.

8. The digital television broadcast system of claim 6, wherein said first and second video streams are received via the internet.

9. The digital television broadcast system of claim 6, wherein:
   said receiver comprises a buffering unit for receiving and buffering said second video stream to generate a second buffered video stream; and
   said second processor comprises a decoder for decoding said second buffered video stream to generate said second processed video stream.

10. A method for switching reception channels in a digital television broadcast system comprising:
    receiving in a digital video apparatus a first and second video streams;
    processing said first video stream to generate a first processed video stream, said processing having a first associated processing delay, wherein said processing said first video stream comprises:
    buffering said first video stream to generate a first buffered video stream; performing error correction on said first buffered video stream to generate a first error corrected video stream; decoding said first error corrected video stream to generate a first decoded video stream; and performing error concealment on said first decoded video stream to generate said first processed video stream;
    processing said second video stream to generate a second processed video stream having a second processing delay, the second processing delay corresponding to the first associated processing delay and being shorter than the first associated processing delay;
    rendering said second processed video stream responsive to a channel change command; and subsequently switching from said second processed video stream to said first processed video stream and rendering said first processed video stream by:
    delaying the rendering of said second video stream so that the time difference between said first and second processing delays is compensated and respective reference frames in the processed first video stream and the processed second video stream are time aligned; and
    performing the switching from said second processed video stream to said first processed video stream upon occurrence of the respective reference frames.

11. The method of claim 10, wherein said first and second video streams are received via a multicast system.

12. The method of claim 10, wherein said processing said second video stream comprises:
    buffering said second video stream to generate a second buffered video stream; and
    decoding said second buffered video stream to generate said second processed video stream.

13. The method of claim 10, wherein the switching is performed in response to a predetermined portion of the first video stream being received.

* * * * *